United States Patent
Shimizu

[11] Patent Number: 4,834,202
[45] Date of Patent: May 30, 1989

[54] MOTOR-OPERATED POWER STEERING APPARATUS OF THE RACK-AND-PINION TYPE

[75] Inventor: Yasuo Shimizu, Saitama, Japan

[73] Assignee: Honda Giken Kogyo Kabushiki Kaisha, Tokyo, Japan

[21] Appl. No.: 113,680

[22] Filed: Oct. 27, 1987

[30] Foreign Application Priority Data

Oct. 27, 1986 [JP] Japan .................. 61-164686

[51] Int. Cl.⁴ .................. B62D 5/04
[52] U.S. Cl. .................. 180/79.1; 180/142; 180/148
[58] Field of Search .................. 180/79.1, 142, 148; 364/424.05

[56] References Cited

U.S. PATENT DOCUMENTS 4,735,271 4/1988 Shimizu .................. 180/79.1
4,771,843 9/1988 Shimizu .................. 180/79.1

FOREIGN PATENT DOCUMENTS 61-119467 6/1986 Japan .................. 180/79.1

Primary Examiner—Charles A. Marmor
Assistant Examiner—Donn McGiehan
Attorney, Agent, or Firm—Rosen, Dainow & Jacobs

[57] ABSTRACT

A motor-operated power steering apparatus of the rack-and-pinion type includes a motor control device having a motor driver circuit which generates a large amount of heat and which is spaced from other circuits such as a control circuit and sensors. The motor driver circuit, the control circuit, and the sensors are clustered around a pinion shaft. The power steering apparatus has high operation reliability free from heat susceptibility and small and compact in size. The power steering apparatus includes a pinion shaft, a rack shaft, a gear case supporting the pinion shaft and the rack shaft, an electric motor for generating assistive power, a torque detector for detecting steering torque, and a motor control device including a control circuit and a driver circuit. The control circuit and the driver circuit are separated from each other, the torque detector and the control circuit being disposed within the gear case in the vicinity of the pinion shaft and on one side of a plane passing through the rack shaft in crossing relation to the pinion shaft, the driver circuit being disposed on the gear case on the other side of the plane.

5 Claims, 5 Drawing Sheets

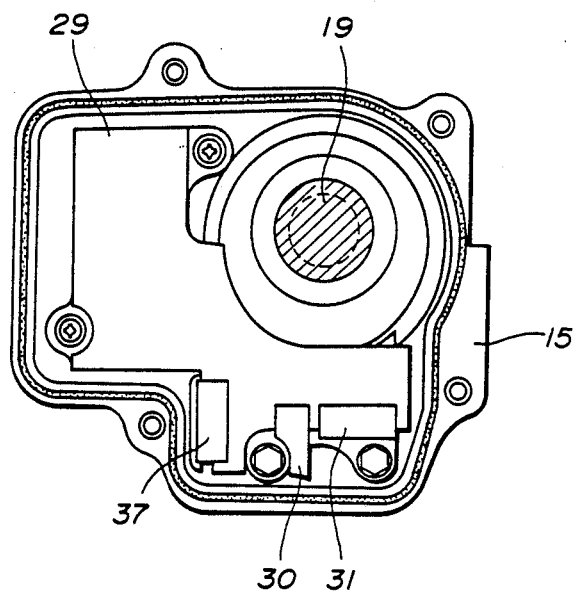
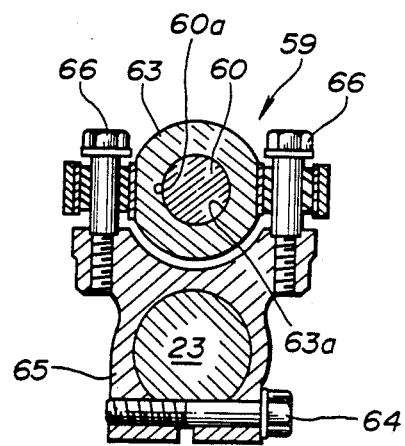

MOTOR-OPERATED POWER STEERING APPARATUS OF THE RACK-AND-PINION TYPE

BACKGROUND OF THE INVENTION

1. Field of the Invention

The present invention relates to a motor-operated power steering apparatus of the rack-and-pinion type, and more particularly to an improvement in the structure and arrangement of a motor control device in the motor-operated power steering apparatus.

2. Description of the Relevant Art

Conventional motor-operated power steering apparatus of the rack-and-pinion type include an electric motor disposed on or in a gear case for generating assistive steering power and a torque detector disposed near a gear mechanism in the gear case. A control device for controlling the motor is housed in a unit case attached to a vehicle body separately from the gear case. The motor and the torque detector are electrically connected to the control device in the unit case by means of lead wires. Since the unit case and the gear case are independent of each other, they have to be attached separately to the vehicle body. The lead wires between the separate unit case and the gear case are long and the arrangement of the lead wires tends to be complex, causing an electric power loss. Inasmuch as the long lead wires are liable to pick up noise from other electric devices, the reliability of the apparatus is reduced. In addition, the cost of manufacture is high as the assembly procedure is time-consuming.

To solve the above problems, there has been proposed a motor-operated power steering apparatus in which a motor control device including a control circuit and a driver circuit is accommodated in a gear case to make the apparatus smaller and more compact, and to reduce the cost, the electric power loss, and the noise susceptibility, as disclosed in Japanese Laid-Open Patent Publication No. 61-119467.

With the electric control device housed in the gear case, however, the heat generated by the driver circuit when large currents flow through power transistors which drive the motor adversely affects the other circuit components situated near the driver circuit. Where the gear case is located in an engine compartment that houses an engine and various heat generating parts, the control circuit is adversely affected by a hot atmosphere produced therearound.

SUMMARY OF THE INVENTION

In view of the aforesaid drawbacks of the conventional motor-operated power steering apparatus described above, it is an object of the present invention to provide a motor-operated power steering apparatus of the rack-and-pinion type which includes a control circuit less susceptible to heat and has short lead wires in a simple arrangement thereof for accomplishing increased apparatus reliability and a greater cost reduction.

According to the present invention, a motor-operated power steering apparatus of the rack-and-pinion type comprises a pinion shaft having a pinion and adapted to be operatively coupled to a steering wheel, a rack shaft having a rack meshing with the pinion and adapted to be operatively coupled to dirigible wheels, a gear case housing the pinion and the rack and supporting the pinion shaft and the rack shaft, an electric motor for generating assistive power to be applied to the rack shaft, a torque detector for detecting steering torque applied to the pinion shaft and issuing a torque signal indicative of the applied steering torque, and a motor control device including a control circuit responsive to a detected signal including the torque signal for determining and issuing a motor control signal and a driver circuit for driving the electric motor based on the motor control signal, the control circuit and the driver circuit being separated from each other, the torque detector and the control circuit being disposed within the gear case in the vicinity of the pinion shaft and on one side of a plane passing through the rack shaft in crossing relation to the pinion shaft, the driver circuit being disposed on the gear case on the other side of the plane.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is a cross-sectional view taken along line III—III of FIG. 1;

FIG. 4 is a cross-sectional view taken along line IV—IV of FIG. 1;

DETAILED DESCRIPTION OF THE PREFERRED EMBODIMENT

Figure 1:
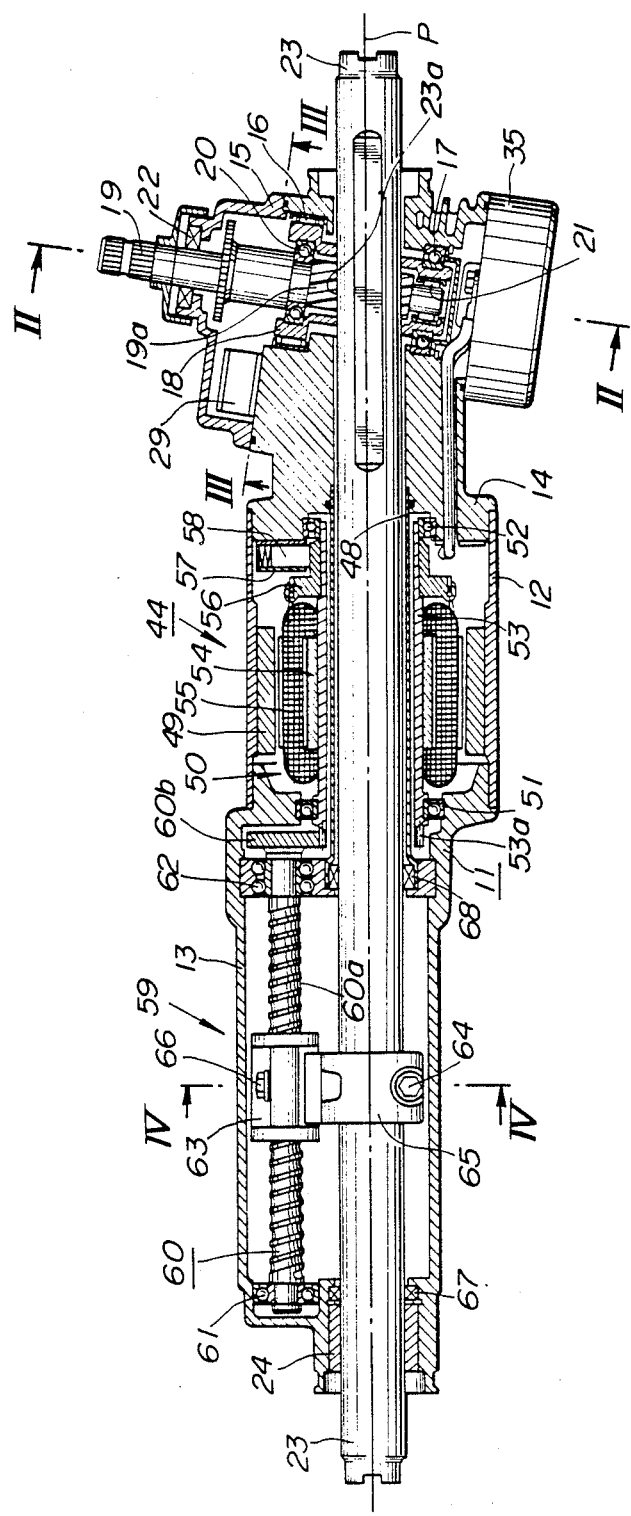
FIG. 1 is a longitudinal cross-sectional view of a motor-operated power steering apparatus of the rack-and-pinion type according to the present invention.
Figure 2:
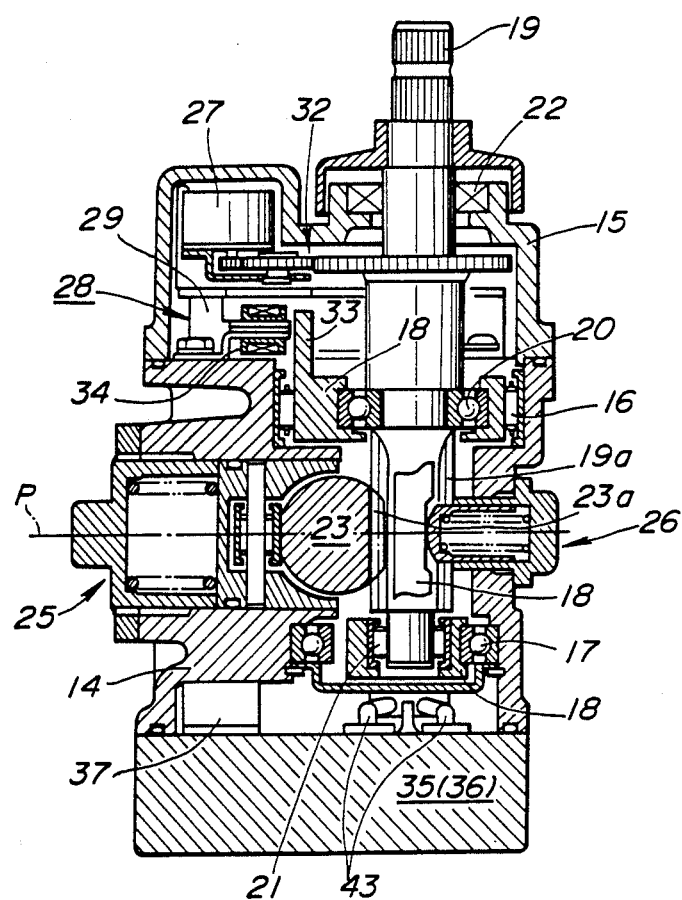
FIG. 2 is a cross-sectional view taken along line II—II of FIG. 1.

As shown in FIG. 1, a gear case 11 is disposed in a vehicle engine compartment (not shown) and comprises a cylindrical central case member 12, a pair of side case members 13, 14 with ends fitted respectively in opposite end openings of the central case member 12, and a pinion case 15 mounted on the side case member 14. A substantially cylindrical pinion holder 18 is rotatably supported in the side case member 14 by means of bearings 16, 17. A pinion shaft 19 is rotatably supported in the pinion holder 18 by means of bearings 20, 21. The pinion shaft 19 has an upper end projecting out of the pinion case 15 and operatively coupled to a steering wheel (not shown). A seal member 22 is provided as a seal between the pinion case 15 and the pinion shaft 19. The pinion holder 18 and the pinion shaft 19 have their axles of rotation offset or displaced eccentrically from each other, so that the pinion holder 18 is slightly rotated in response to rotation of the pinion shaft 19. As shown in FIG. 2, the pinion holder 18 is normally urged to its neutral position by a neutralizer mechanism 26 (FIG. 2).

The rack shaft 23 is operatively coupled to two dirigible wheels (not shown) through a linkage mechanism including tie rods. The rack shaft 23 is axially slidably supported by a plain bearing 24 in the side case member 13 and a rack guide mechanism 25 (FIG. 2) disposed near the pinion shaft 19. The rack shaft 23 has rack teeth 23a on its back which are held in mesh with a pinion gear 19a on the pinion shaft 19.

Figure 5:
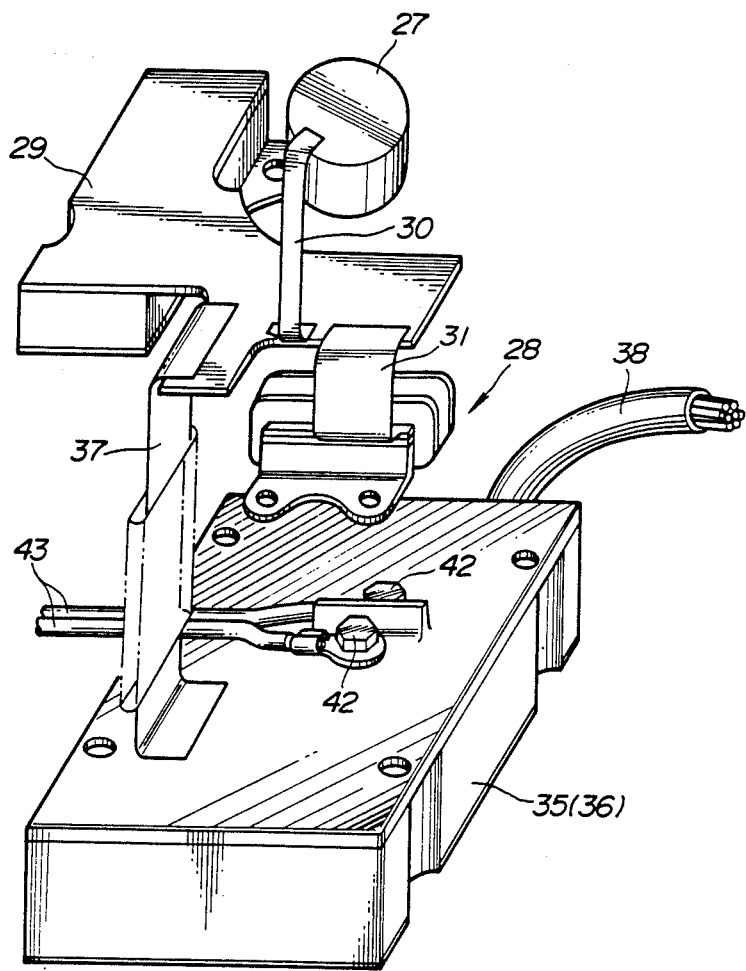
FIG. 5 is a perspective view of a portion of the power steering apparatus of the invention.

As shown in FIGS. 2 and 3, a steering rotation sensor 27, a steering torque sensor 28, and a control circuit 29 are disposed in the pinion case 15 above the rack shaft 23 alongside of the pinion shaft 19. As shown in FIG. 5, the steering rotation sensor 27 and the steering torque sensor 28 are electrically connected to the control circuit 29 by respective printed leads 30, 31. The steering rotation sensor 27 comprises a DC generator having an input shaft coupled to the pinion shaft 19 through a gear mechanism 32 (FIG. 2) and generates a signal having a potential commensurate with the speed of rotation of the pinion shaft 19 at a polarity dependent on the direction of rotation thereof. The steering torque sensor 28 comprises a movable iron core 33 projecting on an upper surface of the pinion holder 18 and a differential transformer 34 mounted in the side case member 14 and electrically coupled to the control circuit 29. The control circuit 29 applies an AC pulsed signal to the differential transformer 34, which issues a signal indicative of angular displacement of the pinion holder 18, i.e., steering torque applied to the pinion shaft 19, and applies the signal to the control circuit 29.

The control circuit 29 is disposed near the steering torque sensor 28 in the vicinity of the pinion shaft 19 within the pinion case 15. The control circuit 29 is positioned on one side, closer to the steering wheel, of a plane P passing axially through the rack shaft 23 in crossing relation to the pinion shaft 19. As shown in FIG. 5, the control circuit 29 is electrically connected to an electric motor driver circuit 36 housed in a unit case 35 by means of printed leads 37. The control circuit 29 is also electrically coupled via the printed leads 37 and leads in a lead cable 38 extending from the unit case 35 to a battery 41 (FIG. 6) through a key switch circuit 39 and a fuse circuit 40.

The motor driver circuit 36 is disposed on the other side, remote from the steering wheel, of the plane P, and is housed in the unit case 35 fixed to the lower end of the side case member 14. The motor driver circuit 36 is electrically coupled to an electric motor 44 through a pair of leads 43 which have ends fastened to the unit case 35 by screws 42. The motor driver circuit 36 is also electrically connected via leads in the lead cable 38 to the battery 41 through a relay circuit 45 (FIG. 6) and the fuse circuit 40. The lead cable 38 includes leads connected to a warning lamp 46 and a vehicle speed sensor 47, which are electrically connected to the control circuit 29 by the lead cable 38 and the printed leads 37. The control circuit 29 and the motor driver circuit 36 are described below in detail.

The electric motor 44 for generating assistive steering power commensurate with an electric current passing therethrough is disposed around the rack shaft 23 and a collar 48 within the central case member 12. The electric motor 44 comprises field magnets 49 fixed to the inner peripheral surface of the central case member 12 and a rotor 50 disposed between the field magnets 49 and the collar 48. The rotor 50 has a tubular shaft 53 rotatably supported as a motor output shaft by bearings 51, 52. Around the rotor 50, there are coaxially and integrally disposed a laminated iron core 54 having a skewed groove and multiplexed armature windings 55. The armature windings 55 are electrically connected to the motor driver circuit 36 through a commutator 56 fixed to the tubular shaft 53 and a brush 58 disposed in a brush holder 57 and held in sliding contact with the commutator 56.

A ball screw mechanism 59 is disposed in the side case member 13 on the lefthand (as viewed in FIG. 1) side of the motor 44 for transmitting assistive power generated by the motor 14 to the rack shaft 23. The ball screw mechanism 59 comprises a screw shaft 60 having a helical groove 60a defined in its outer peripheral surface and rotatably supported in the side case member 13 by bearings 61, 62, the screw shaft 60 extending parallel to the rack shaft 23, a nut member 63 having a helical groove 63a (FIG. 4) defined in its inner peripheral surface in registry with the helical groove 60a and fitted over the screw shaft 60, and a number of balls (not shown) rollingly riding in the helical grooves 60a, 63a. A gear 60b is fixed to the righthand (FIG. 1) end of the screw shaft 60 and held in mesh with a gear 53a on the lefthand end of the tubular shaft 53. Thus, the screw shaft 60 can be rotated about its own axis by the motor 44. As shown in FIG. 4, the nut member 63 is secured by a pair of bolts 66 to a rack holder 65 which is fastened to the rack shaft 23 by means of a bolt 64. Therefore, the nut member 63 is axially movable in unison with the rack shaft 23.

Between the rack shaft 23 and the side case member 13, there are disposed seal members 67, 68 that seal the space within the side case member 13 in which the ball screw mechanism 59 is disposed.

Figure 6:
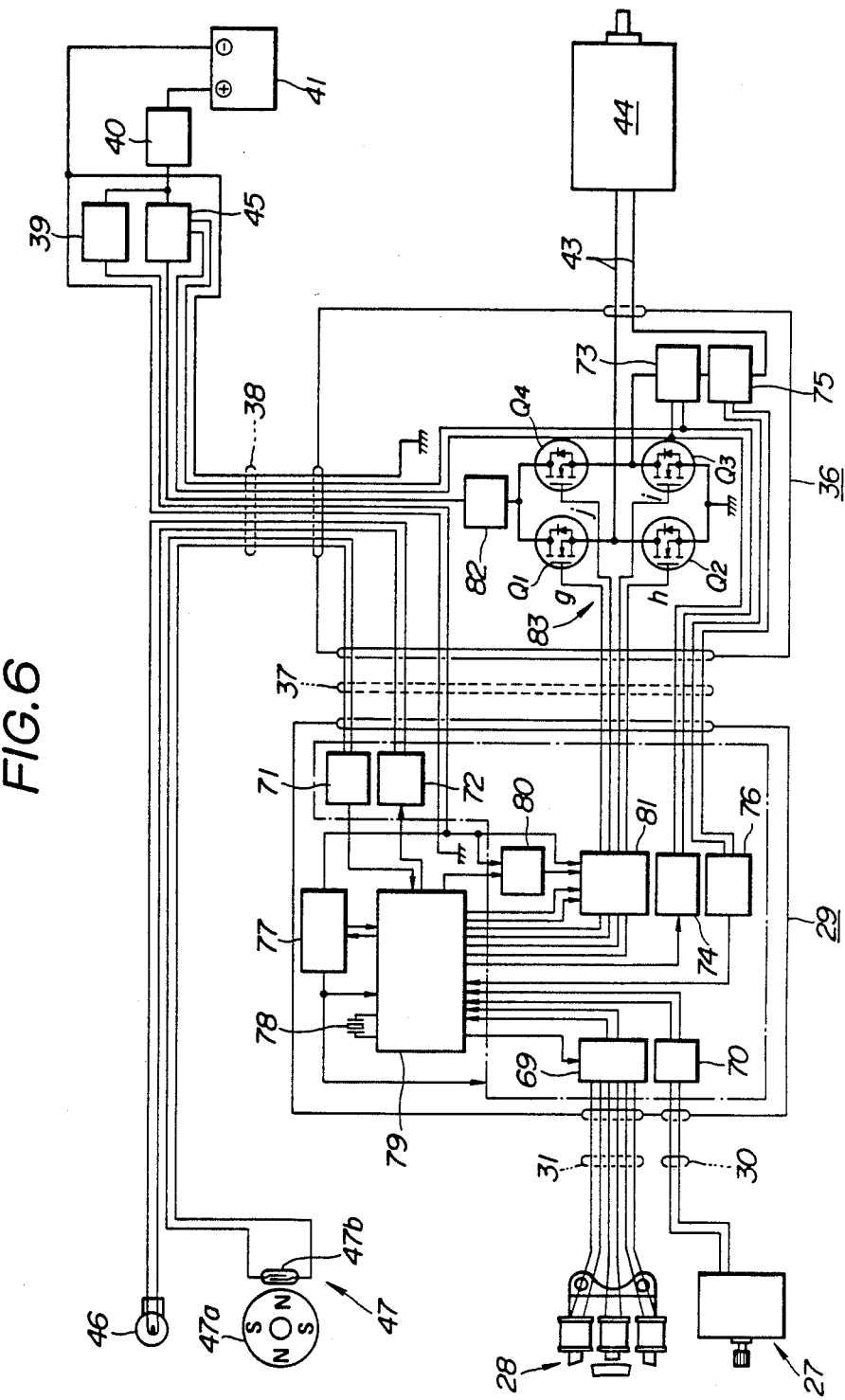
FIG. 6 is a circuit diagram of an electric motor control device in the power steering apparatus of the invention.

As shown in FIG. 6, the vehicle speed sensor 47 and the warning lamp 46 are electrically connected to the control circuit 29 through the printed leads 37 and the lead cable 38, as described above. The vehicle speed sensor 47 has a rotary disk 47a having magnetic poles S, N at equally spaced angular intervals and a reed switch 47b operable when approached by the magnetic poles S, N. The rotary disk 47a is fixed to the output shaft of a transmission or the like, and the reed switch 47b produces a pulsed signal having a frequency commensurate with the vehicle speed. The pulsed signal from the reed switch 47b is applied to the control circuit 29. The warning lamp 46 is located near the driver's seat so that it can easily be viewed by the driver.

The structure and operation of the control circuit 29 and the driver circuit 36 is described below in detail.

As shown in FIG. 6, the control circuit 29 includes an interface 69 for the steering torque sensor 28, an interface 70 for the steering rotation sensor 27, an interface 71 for the vehicle speed sensor 47, a driver 72 for the warning lamp 46, a driver 74 for a relay circuit 73 in the motor driver circuit 36, an amplifier 76 for a current detector 75 in the motor driver circuit 36, a constant-voltage regulated power supply 77, a quartz oscillator 78, a microcomputer 79, a booster 80, and an output circuit 81. The interface 69 for the steering torque sensor 28 comprises an oscillator, an AC driver, a rectifier, an a low-pass filter. The interface 69 issues an AC pulsed signal to the differential transformer 34 (not shown in FIG. 6) of steering torque sensor 28, converts an output signal from the differential transformer 34 to a signal indicative of the direction and magnitude of the applied steering torque, and applies the output signal to the microcomputer 79. Likewise, the interface 70 for the steering rotation sensor 27 applies a signal indicative of the steering direction and the steering speed to the microcomputer 79. The interface 71 for the vehicle speed sensor 47 applies a digital signal representative of the vehicle speed to the microcomputer 79. The amplifier 76 is connected to the current detector 75 via the printed leads 37 and applies a signal indicative of a current flowing through the motor 44 to the microcomputer 79.

The constant-voltage regulated power supply 77 is connected to the key switch circuit 39 through the printed leads 37 and the lead cable 38 and then to the battery 41 via the key switch circuit 39 and the fuse circuit 40. The constant-voltage regulated power supply 77 supplies electric power of constant voltage to the various circuit elements in the control circuit 29.

The microcomputer 79 comprises a ROM, a RAM, an A/D converter, and a CPU, and processes output signals from the sensors 27, 28, 47 and the current detector 75 and issues signals to the output circuit 81 and the drivers 72, 74 according to a control program stored in the ROM.

The output circuit 81 is supplied with high-voltage electric power from the booster 80 and issues pulse-width modulated driving signals (TWM signals) g, h, i, j based on signals applied from the microcomputer 79. The output circuit 81 has four output terminals connected via the printed leads 37 to a bridge circuit 83 in the motor driver circuit 36. The driver 72 is connected to the warning lamp 46 through the printed leads 37 and the lead cable 38 and energizes the warning lamp 46 in response to a signal applied from the microcomputer 49. Likewise, the driver 74 is connected to the relay circuit 73 via the printed leads 37 and to the relay circuit 45 via the lead cable 38, and energizes solenoids of the relay circuits 73, 45 in response to a signal from the microcomputer 79.

The motor driver circuit 36 comprises the bridge circuit 83 which has four field-effect transistiors (FETs) Q1, Q2, Q3, Q4, a fuse circuit 82, the relay circuit 73, and the current detector 75. The FETs Q1, Q4 have drain terminals connected via the fuse circuit 82 to the relay circuit 45 and source terminals connected to the drain terminals of the FETs Q2, Q3, which have their respective source terminals grounded. The electric motor 44 is connected between the source and drain termnals of the FETs Q1, Q2 and between the source and drain terminals of the FETs Q3, Q4. The PWM signals g, h, i, j are applied from the output circuit 81 to the gate terminals of the FETs Q1, Q2, Q3, Q4 for turning on the FETs Q1, Q3 or Q2, Q4 together or selectively for thereby controlling the direction and value of a current to be fed to the electric motor 44. The PWM signal g is applied to the gate terminal of the FET Q1, the PWM signal h is applied to the gate terminal of the FET Q2, the PWM signal i is applied to the gate terminal of the FET Q3, and the PWM signal j is applied to the gate terminal of the FET Q4. The relay circuit 73 is responsive to an output signal from the control circuit 29 for connecting or disconnecting the motor 44 and the bridge circuit 83. The current detector 75 detects the value of the current fed to the motor 44 and applies a signal indicative of the detected current value to the control circuit 29.

In the motor-operated power steering apparatus of the rack-and-pinion type according to the present invention, output signals from the steering rotation sensor 27, the steering torque sensor 28, and the vehicle speed sensor 47 are processed by the control circuit 29 according to the control program, and the motor driver circuit 36 drives the motor 44 based on control signals from the control circuit 29. The motor 44 generates assistive steering power which is transmitted through the ball screw mechanism 59 to the rack shaft 23, which then reduces steering efforts of the driver.

The gear case 11 is disposed in the engine compartment, and the FETs Q1, Q2, Q3, Q4 in the driver circuit 36 give off heat. Therefore, various circuit components around the FETs are subjected to heat during operation of the power steering apparatus. However, since the control circuit 29, the steering rotation sensor 27, and the steering torque sensor 28 are disposed above the rack shaft 23 in the vicinity of the rack shaft 19 in spaced relation to the motor driver 36, the control circuit 29 is not subject to the heat generated by the driver circuit 36. These sensors, the control circuit 29, and the motor driver circuit 36 are not susceptible to extraneous noise because they are clustered around the pinion shaft 19. The leads interconnecting the sensors, the control circuit 29, and the motor driver circuit 36 are therefore short and simple, and hence are free from the danger of breakage or short-circuiting. Accordingly, the reliability of the apparatus is high.

In the illustrated embodiment, the motor driver circuit 36 with the heat-generating FETs is disposed below the rack shaft 23, i.e., in a lower position in the engine compartment where ambient air flows when the vehicle runs. Therefore, the heat generated by the FETs is radiated to keep the FETs at a constant temperature, and the value of the current fed to the motor 44 is not varied by and does not fluctuate due to temperature variations. Consequently, the assistive steering power produced by the motor 44 is free from variations or fluctuations, and makes the power steering apparatus highly reliable in operation.

With the arrangement of the present invention, as described above, the leads between the motor control device, the sensors, and the motor are short and simply arranged, and the control circuit and the sensors are not adversely affected by the heat emitted by the motor driver circuit. The power steering apparatus is highly reliable in operation and can be manufactured at a reduced cost.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A motor-operated power steering apparatus of the rack-and-pinion type comprising:
   a pinion shaft having a pinion and adapted to be operatively coupled to a steering wheel;
   a rack shaft having a rack meshing with said pinion and adapted to be operatively coupled to dirigible wheels;
   a gear case housing said pinion and said rack and supporting said pinion shaft and said rack shaft;
   an electric motor for generating assistive power to be applied to said rack shaft;
   a torque detector for detecting steering torque applied to said pinion shaft and issuing a torque signal indicative of the applied steering torque;
   a motor control device including a control circuit responsive to a detected signal including said torque signal for determining and issuing a motor control signal and a driver circuit for driving said electric motor based on said motor control signal; and said control circuit and said driver circuit being separated from each other, said torque detector and said control circuit being disposed within said gear case in the vicinity of said pinion shaft and on one side of a plane passing through said rack shaft in crossing relation to said pinion shaft, said driver circuit being disposed on said gear case on the other side of said plane.

2. A motor-operated power steering apparatus according to claim 1, wherein said torque detector and said control circuit are disposed on said one side closer to the steering wheel, and said driver circuit being disposed on said other side remote from the steering wheel.

3. A motor-operated power steering apparatus according to claim 2, wherein said driver circuit is positioned near an end of said pinion shaft remote from the steering wheel.

4. A motor-operated power steering apparatus according to claim 1, further including a unit case mounted on said gear case, said driver circuit being housed in said unit case.

5. A motor-operated power steering apparatus according to claim 1, wherein said control circuit, said torque detector, and said driver circuit are electrically connected by printed leads.

* * * * *

UNITED STATES PATENT AND TRADEMARK OFFICE
CERTIFICATE OF CORRECTION

PATENT NO. : 4,834,202

DATED : May 30, 1989

INVENTOR(S) : YASUO SHIMIZU

It is certified that error appears in the above-identified patent and that said Letters Patent is hereby corrected as shown below:

Column 5, line 18, change "TWM" to --PWM--.

Signed and Sealed this

Twenty-second Day of December, 1992

*Attest:*

DOUGLAS B. COMER

*Attesting Officer*     *Acting Commissioner of Patents and Trademarks*